United States Patent [19]
Ooi et al.

[11] Patent Number: 5,917,628
[45] Date of Patent: Jun. 29, 1999

[54] OPTICAL TIME-DIVISION MULTIPLEXER CAPABLE OF SUPPLYING STABLE OUTPUT SIGNAL

[75] Inventors: Hiroki Ooi; George Ishikawa; Hiroshi Nishimoto, all of Kawasaki, Japan

[73] Assignee: Fujitsu Co. Ltd., Kawasaki, Japan

[21] Appl. No.: 08/788,033

[22] Filed: Jan. 23, 1997

[30] Foreign Application Priority Data

Mar. 19, 1996 [JP] Japan .................................... 8-062949

[51] Int. Cl.$^6$ ...................................................... H04J 14/08
[52] U.S. Cl. ............................ 359/135; 359/138; 359/183
[58] Field of Search ..................... 359/135, 180, 359/181, 187, 183, 188, 138; 372/26, 28, 29, 30; 385/3

[56] References Cited

U.S. PATENT DOCUMENTS

| | | | |
|---|---|---|---|
| 5,101,450 | 3/1992 | Olshansky | 385/3 |
| 5,170,274 | 12/1992 | Kuwata et al. | 359/182 |
| 5,249,243 | 9/1993 | Skeie | 385/3 |
| 5,317,443 | 5/1994 | Nishimoto | 359/187 |
| 5,359,449 | 10/1994 | Nishimoto et al. | 359/181 |

FOREIGN PATENT DOCUMENTS 2-167524  6/1990  Japan .

*Primary Examiner*—Rafael Bacares

[57] ABSTRACT

An optical time-division multiplexer in which the phase difference between two optical signals to be used for the synthesis of an output optical signal thereof is maintained at a constant value, regardless of variations in accuracy of the manufacture thereof. Thereby, stable output optical signals are obtained at all times. The optical time-division multiplexer includes first and second optical modulators to respectively output first and second optical modulation signals synchronized with a clock signal and corresponding to different time slots, respectively; an optical coupler for performing time-division multiplexing of the first and second optical modulation signals respectively outputted by the first and second optical modulators; and an optical-phase adjusting unit to receive at least one of the first and second optical modulation signals and to regulate an optical phase of the inputted optical signal. The phase difference between the first and second optical modulation signals inputted to the optical coupler is adjusted by the optical-phase adjusting unit to a desired value to obtain a desired output optical signal.

9 Claims, 17 Drawing Sheets

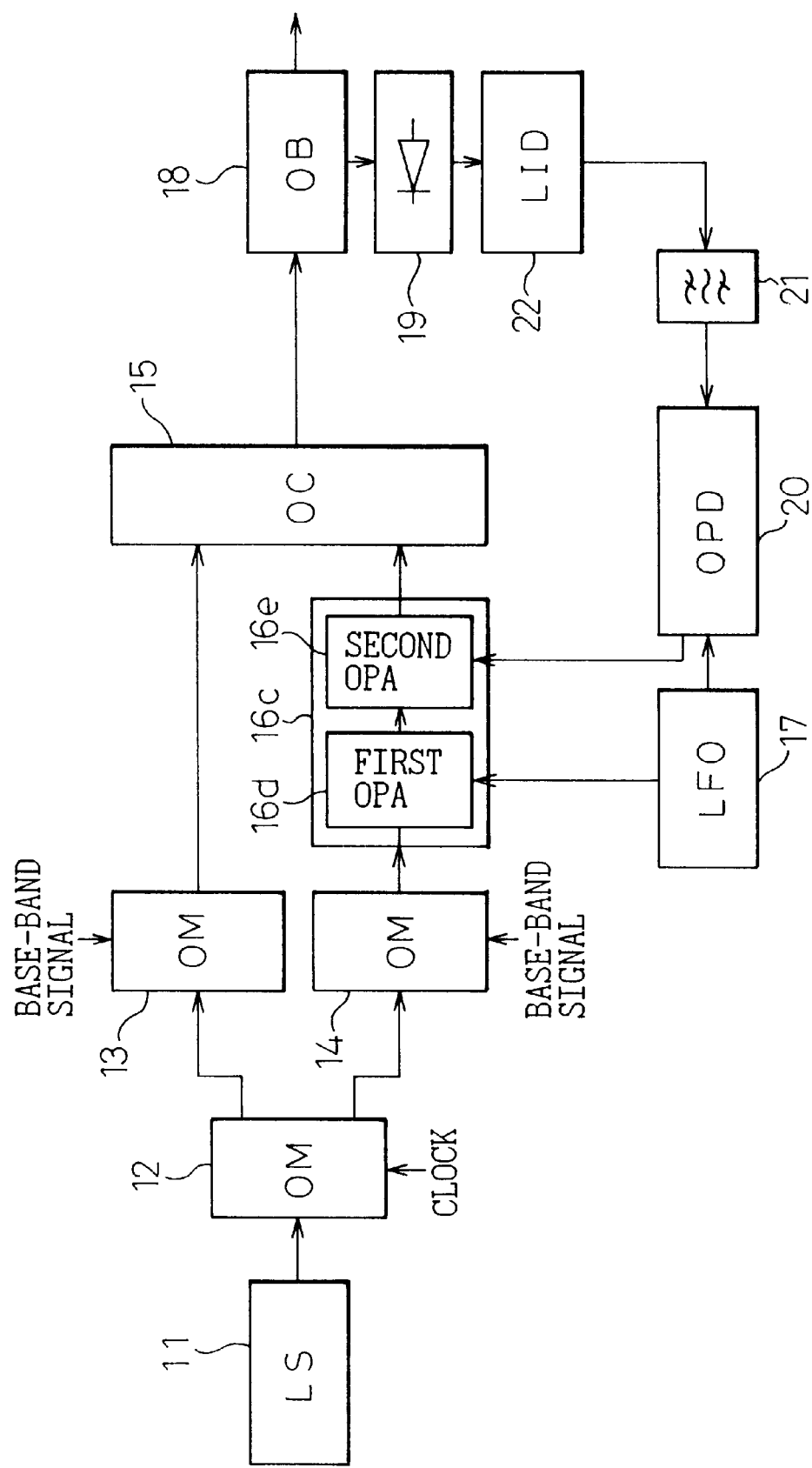

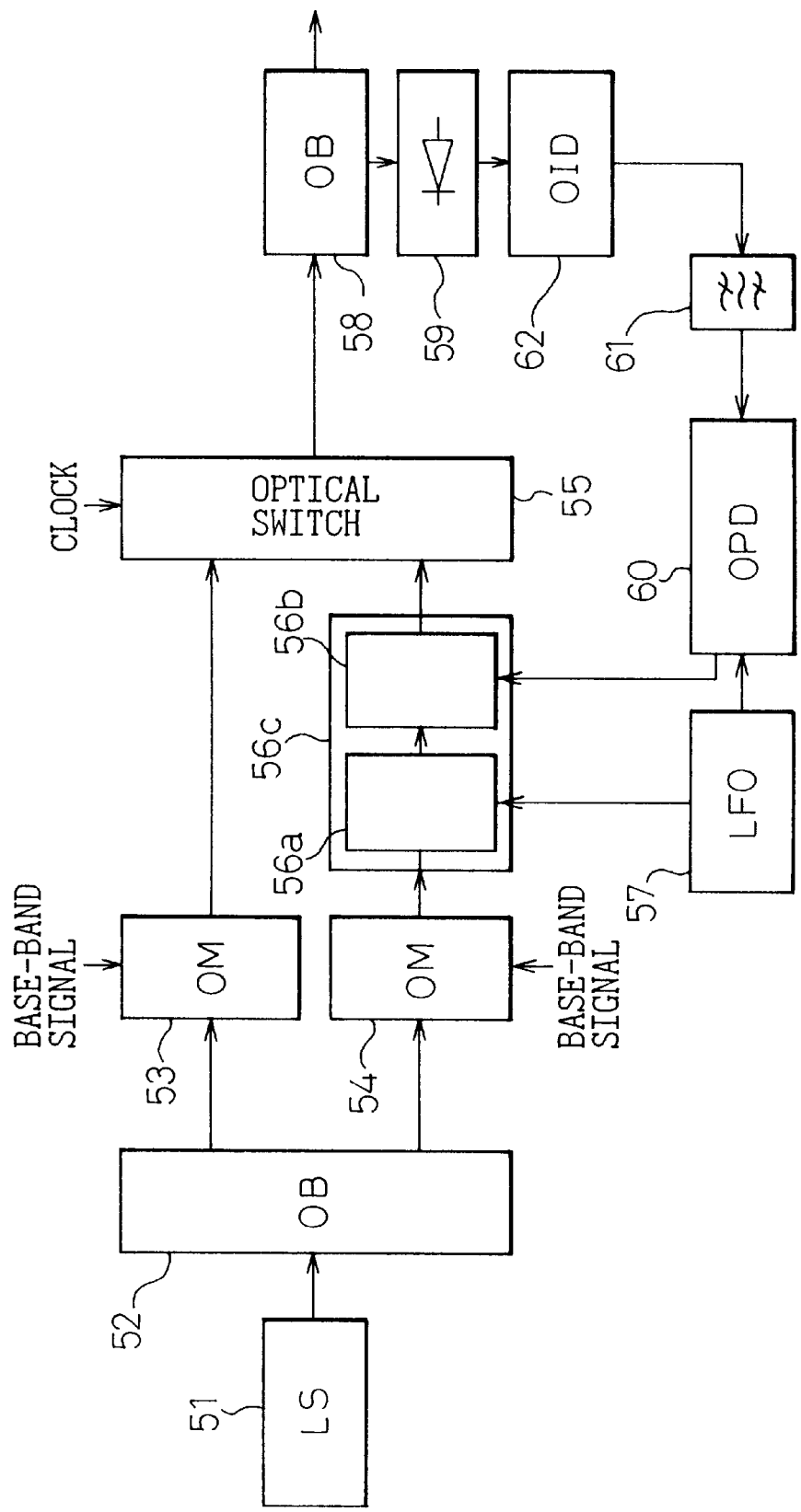

OPTICAL TIME-DIVISION MULTIPLEXER CAPABLE OF SUPPLYING STABLE OUTPUT SIGNAL

BACKGROUND OF THE INVENTION

1. Field of the Invention

The present invention generally relates to an optical time-division multiplexer for performing time-division multiplexing of optical modulation signals, and more particularly to an optical time-division multiplexer adapted to provide a stable output pattern by regulating the optical phases of two optical modulation signals to be multiplexed.

2. Description of the Related Art

In recent years, with increase in the amount of information transmitted, there have been demands for a high-capacity communication system. Thus, optical communication systems need to be speeded up. To increase the bit-rate at which light (or optical) intensity modulation is performed, the working (or acting) speed of electronic circuit parts must be increased. However, under the present conditions, it is difficult to manufacture an electronic circuit which operates at a high speed, for example, at a bit-rate of more than 20 GHz. To solve such problems, there have been various methods of multiplexing of optical signals (or light signals).

For instance, an optical time-division multiplexer disclosed in the Japanese Unexamined Patent Publication (Kokai) No. 2-167524 has: a light source, such as a semiconductor laser, for outputting light oscillating in a single longitudinal mode; a first optical modulator for modulating an output of the light source, by using a clock signal having a frequency, which corresponds to a half of a desired data rate, and for outputting complementary optical clock pulses whose polarities are opposite to each other; second and third optical modulators for modulating a pair of outputs of the first optical modulator, by using a pair of data signals which are different in phase from each other by 180 degrees and are synchronized with the clock signal, and for outputting only the pulses which coincide with data signals among the optical clock pulses inputted from the first optical modulator; and an optical coupler for synthesizing an optical signal from the optical outputs of the second and third optical modulators. In the case of this optical time-division multiplexer, each of the optical modulators is driven by using the clock signal having a frequency which corresponds to half of the data rate. Thus, the frequency of a drive (or driving) signal for the electronic circuit is lowered. Namely, optical signals are modulated at a frequency that is twice the threshold frequency of the drive signal for the electronic circuit.

In the case of the (conventional) optical time-division multiplexer disclosed in the Japanese Unexamined Patent Publication (Kokai) No. 2-167524, even if two optical signals, which are incident on the optical coupler and are used for synthesizing an output optical signal thereof, are optical complementary pulse signals, the output optical signal changes when the optical phase varies. Under the existing conditions, an optical signal which is obtained when the optical phases of two optical signal to be incident on the optical coupler is different from each other by 180 degrees, is most desirable. Therefore, in the case that such an optical time-division multiplexer is formed on a single circuit board or substrate, the optical time-division multiplexer is designed so that the optical phase difference between two optical signals to be incident on the optical coupler is 180 degrees. However, in the case of actual optical time-division multiplexers, owing to variations in accuracy of the manufacture of the optical time-division multiplexer, it often occurs that the optical phase difference therebetween deviates from 180 degrees. Consequently, the conventional optical time-division multiplexer has a problem in that desirable optical signals are not obtained.

Moreover, in the case that the characteristics or properties of the optical modulator change owing to a variation in temperature, the optical phase difference between two optical signals to be incident on the optical coupler also changes. Therefore, the conventional optical time-division multiplexer has another problem in that even if the optical phase difference between two optical signals to be incident on the optical coupler is 180 degrees in an initial stage and thus a desirable output optical signal is initially outputted therefrom, the output optical signal changes later in response to variation in environmental conditions.

SUMMARY OF THE INVENTION

It is, accordingly, an object of the present invention to realize an optical time-division multiplexer which is able to output a desirable optical signal at all times, regardless of variations in accuracy of the manufacture thereof.

Further, it is another object of the present invention to provide an optical time-division multiplexer in which the phase difference between two optical signals to be used for the synthesis of an output optical signal thereof is maintained at a constant value, irrespective of variations in environmental conditions, thereby obtaining stable output optical signals.

To achieve the foregoing objects, in accordance with the present invention, there is provided an optical time-division multiplexer for performing time-division multiplexing of a plurality of optical modulation signals, which comprises: first and second optical modulators which are adapted to respectively output first and second optical modulation signals that are synchronized with a clock signal and correspond to different time slots, respectively; an optical coupler for performing time-division multiplexing of the first and second optical modulation signals respectively outputted by the first and second optical modulators; and an optical-phase adjusting unit which is provided in such a manner that at least one of the first and second optical modulation signals is inputted thereto and is operative to regulate an optical phase of the inputted optical signal.

Thus, in the case of the optical time-division multiplexer of the present invention, the phase difference between the first and second optical modulation signals inputted to the optical coupler is adjusted by the optical-phase adjusting unit to a desired value. Consequently, a desired output optical signal is obtained.

Further, in order to maintain the phase difference between two optical signals to be used for the synthesis of an output optical signal thereof at a constant value, irrespective of variations in environmental conditions, and to obtain stable output optical signals, the optical-phase adjusting unit is adapted to change adjustment amounts of the optical phase, which respectively correspond to the (first and second) optical modulation signals, according to a regulation control signal and is further adapted to control the first and second optical modulation signals in such a way that the optical-phase difference therebetween is 180 degrees. As above described, when the optical-phase difference between the first and second optical modulation signals is 180 degrees, the overlapping skirt (or slope) portions of the optical pulses of these optical modulation signals cancel each other out. Thus, the light intensity of an optical signal outputted from the optical coupler becomes minimum. In contrast, when the optical-phase difference therebetween is 0, the overlapping skirt (or slope) portions of the optical pulses are added to each other. Thus, the light intensity of the outputted optical signal becomes maximum. Therefore, the optical-phase difference therebetween is maintained at 180 degrees by regulating (or controlling) the optical-phase adjusting unit in such a way that the light intensity is minimum. Further, the optical-phase difference therebetween is maintained at 0 by regulating (or controlling) the optical-phase adjusting unit in such a way that the light intensity is maximum. However, because of the fact that the intensity of an output optical signal varies with data, the condition of the optical-phase difference cannot be determined by simply detecting the light intensity of the optical signal.

Thus, in order to detect the optical-phase difference, the optical time-division multiplexer of the present invention is further provided with: a low-frequency oscillator for generating a low-frequency signal, whose frequency is sufficiently lower than that of the clock signal; an optical-phase-detection/control circuit for detecting a frequency-component signal of the low-frequency signal from the optical signal outputted from the optical coupler, for making a comparison between optical-phases of the detected frequency-component signal and the low-frequency signal and for generating a control signal according to a result of the comparison; and a low-frequency signal superimposing circuit for generating a regulation control signal by superimposing the low-frequency signal on the control signal.

When the low-frequency signal is applied from the low-frequency signal superimposing circuit to the optical-phase adjusting unit and further, the optical phase of one of the optical modulation signals is changed, the optical phases of the first and second optical modulation signals varies in response to such a change. Moreover, when the optical phases change at a period of the low-frequency signal, the intensity of an optical signal outputted by the optical coupler changes. When the optical-phase difference changes in a small range from 180 degrees or 0 periodically, the frequency of change in the intensity of the outputted optical signal varies at a frequency which is twice that of the low-frequency signal. Moreover, as the center of the range of the change of the optical-phase difference increases or decreases from 180 degrees or 0, a frequency-component signal of the same frequency as of the low-frequency signal increases. Furthermore, when detected, the phase of such a frequency-component signal changes from that of the low-frequency signal inversely corresponding to the increase or decrease of the center of the range of the change of the optical-phase difference from 180 degrees or 0. Thus, by detecting a frequency-component, whose frequency is equal to that of the low-frequency signal, of an intensity signal representing the intensity of the optical signal outputted from the optical coupler and further detecting a phase of the detected frequency component relative to that of the low-frequency signal when the detected frequency component is maximum, it is determined whether the optical-phase difference should be increased or decreased when the center of the range of the change of the optical-phase difference is shifted from 180 degrees or 0. Thus, in the case of the optical time-division multiplexer of the present invention, the optical-phase difference is maintained or held at 180 degrees or 0 at all times by first detecting the phase of the frequency-component of the same frequency as of the intensity signal corresponding to the optical signal outputted from the optical coupler, next determining whether the optical-phase difference should be increased or decreased when the center of the range of the change of the optical-phase difference is shifted from 180 degrees or 0, and performing a feed-back control operation according to a result of a determination in such a manner that the optical-phase difference is 180 degrees or 0.

Further, the following configurations may be employed as that of the optical-phase adjusting unit being capable of changing the adjustment amount for the optical phase of the optical modulation signal in response to the regulation control signal. Namely, in the case of one of such configurations, an electrode is formed on a dielectric waveguide. Further, the regulation control signal is applied from the low-frequency superimposing circuit to this electrode. Moreover, the optical phase of the optical modulation signal propagating through the waveguide is controlled by an electric field strength (or intensity). Alternatively, in the case of another example of such a configuration, a heating electrode is formed on a waveguide made of a material whose refractive index varies with temperature. Further, the regulation control signal is applied from the low-frequency superimposing circuit to this heating electrode. Thereby, the optical phase of the optical modulation signal propagating through the waveguide is controlled. Further, alternatively, in the case of still another example of such configurations, the optical-phase adjusting unit is provided with an electro-mechanical transducer device which is operative to change a space propagation path length. Moreover, the electromechanical transducer device is controlled in accordance with the regulation control signal sent from the low-frequency signal superimposing circuit. Thereby, the optical phase of the optical modulation signal is controlled.

Incidentally, as above described, under the present conditions, an optical signal which is obtained when the optical phases of two optical signal to be incident on the optical coupler is different from each other by 180 degrees is most desirable. It is, therefore, preferable that the optical-phase-detection/control circuit generates the control signal so that the optical phase difference between two optical signals to be incident on the optical coupler is 180 degrees.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 12 is a block diagram illustrating the configuration of still another optical time-division multiplexer which is a third embodiment of the present invention;

FIG. 17 is a block diagram illustrating the configuration of yet another optical time-division multiplexer which is a fifth embodiment of the present invention.

DETAILED DESCRIPTION OF THE PREFERRED EMBODIMENTS

Before proceeding to a detailed description of the preferred embodiments of the present invention, a prior art optical time-division multiplexer will be described hereinbelow, with reference to the accompanying drawings relating thereto, for a clearer understanding of the differences between the present invention and the prior art.

Figure 1:
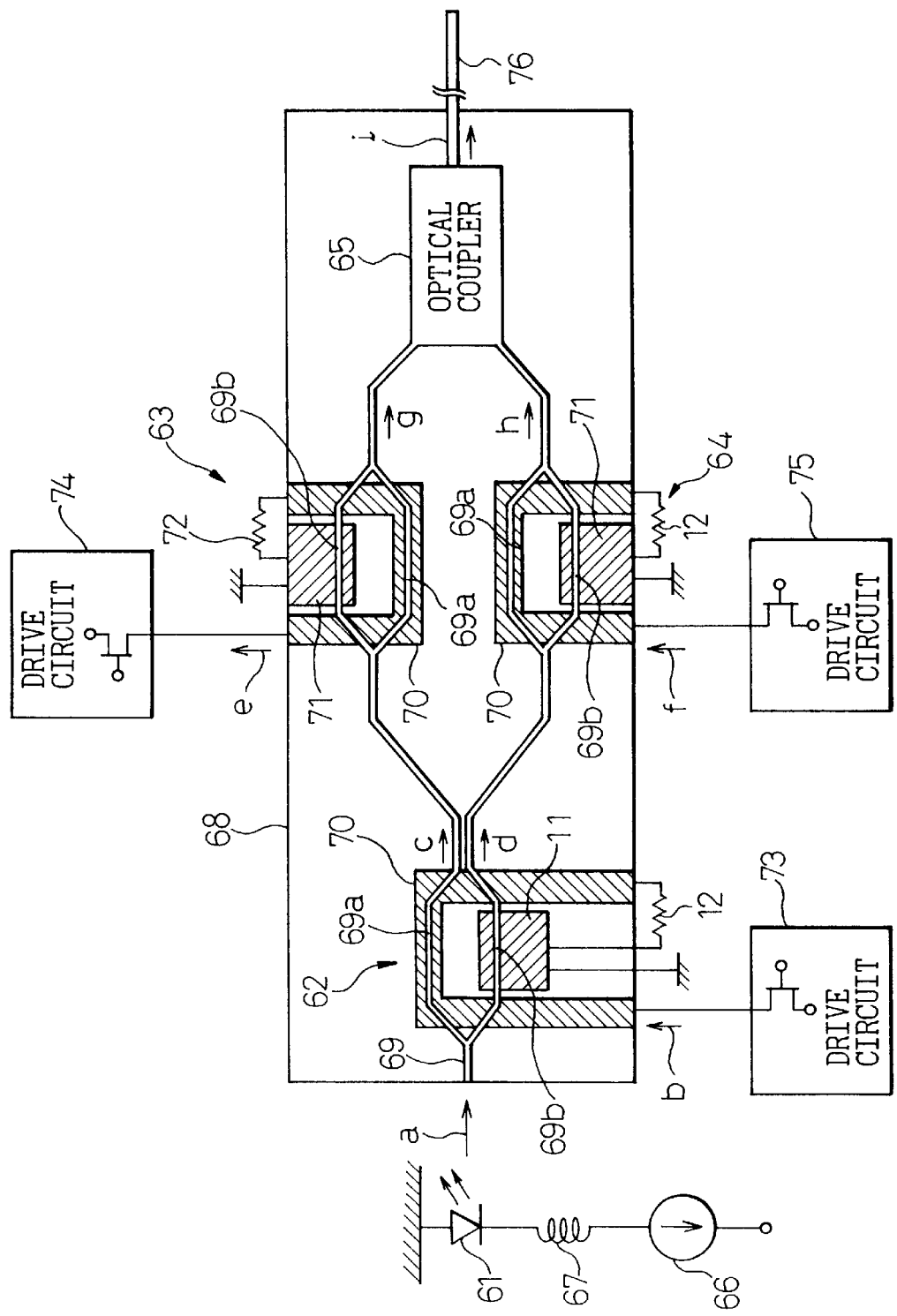
FIG. 1 is a diagram illustrating the circuit configuration of a conventional optical time-division multiplexer.

FIG. 1 is a diagram illustrating the circuit configuration of the conventional optical time-division multiplexer described in the Japanese Unexamined Patent Publication (Kokai) No. 2-167524. In FIG. 1, reference number 61 designates a distributed-feedback semiconductor laser which is operative to oscillate in a single longitudinal mode and is driven by a constant-current power supply 66 through an inductor (or coil) 67. Reference numeral 62 denotes a branching optical modulator acting as an optical branching device; and 63 and 64 denote first and second optical modulators. In the case of this optical time-division multiplexer, Mach-Zehnder optical modulators are used as the first and second optical modulators 63 and 64. Further, the structure of the branching optical modulator 62 is basically similar to that of the Mach-Zehnder optical modulator except that an output portion of the optical modulator 62 is a directional coupler. Mach-Zehnder optical modulators are publicly known and therefore, the configuration thereof will be described hereinbelow only briefly. Three optical modulators 62, 63 and 64 are provided on a single circuit board 68. An optical waveguide 69 is made of lithium niobate (LiNbO$_3$) which has an electro-optical property, by which the refractive index thereof varies with an electric field. Further, in each of the optical modulators 62, 63 and 64, the optical waveguide 69 is branched into two branch optical waveguides 69a and 69b. Moreover, electric fields of the reverse or opposite polarities are applied to the branch paths 69a and 69b by a strip line 70, which is formed in such a manner as to have constant characteristic impedance therealong, and a grounding electrode, respectively. Thus, the refractive indices of the branch paths 69a and 69b change inversely with each other, so that the optical-phases of the light beams (or optical signals) propagating through the branch paths 69a and 69b is shifted from each other. Consequently, in the branching optical modulator 62, the light beams, whose phases are shifted from each other, are obtained from the branch paths 69a and 69b, respectively. Further, in the directional coupler of the output portion, the interference occurs between the light beams obtained respectively from the branch paths 69a and 69b. Thus, outputs, which respectively have reverse (or opposite) polarities, are obtained from the optical modulator 62. Moreover, in each of the first and second optical modulators 63 and 64, an output signal is synthesized from the light beams which have passed through the branch paths 69a and 69b at the corresponding output terminal thereof. At that time, interference therebetween occurs thereat. Thus, the intensities of the light beams to be used for the synthesis are changed. Consequently, the optical modulation is performed at the applied voltage. Reference numeral 72 designates a terminating resistance connected between the electrode and the strip line. Drive circuits 73, 74 and 75 are connected to the strip lines 70 of the optical modulators 62, 63 and 64, respectively. For instance, field effect transistors are used as the drive circuits 73, 74 and 75. Further, the drain of each of these drive circuits is connected to the strip line 70. Moreover, electric current drawn therefrom is controlled by the electric field applied to a gate. In the case of this conventional multiplexer, a clock signal, whose frequency is half of the desired data rate, is outputted from the drive circuit 73. Furthermore, a pair of complementary data signals, which are Non-Return-to-Zero (NRZ) signals, are outputted from the drive circuits 74 and 75 by being synchronized with the clock signal, which is outputted from the drive circuit 73, in such a way that the phase of these data signals are shifted 180 degrees from each other. Therefore, in the first and second optical modulators 63 and 64, the modulation is performed at a data rate which is half the desired data rate.

The output terminals of the first and second optical modulators 63 and 64 are connected to an optical coupler 65. Various optical couplers may be used as the optical coupler 65. Further, an optical signal is outputted from the output terminal of the optical coupler 65 at a data rate, which is twice the frequency of the clock signal, and is further transmitted through an optical fiber 76.

Figure 2:
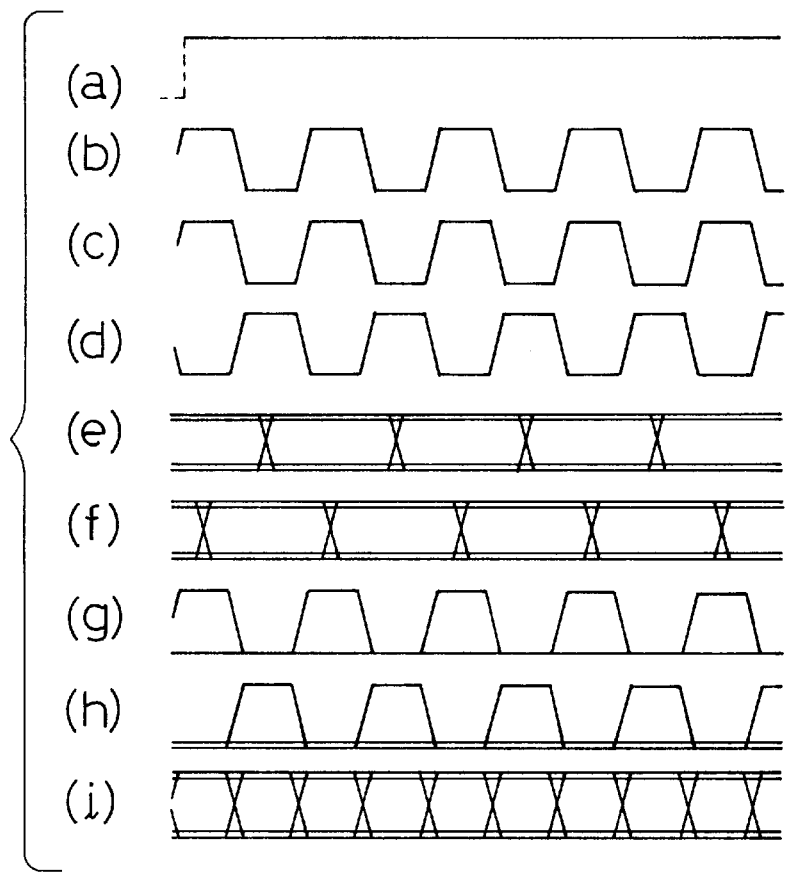
FIG. 2 is a time chart illustrating examples of signals used in parts of the conventional optical time-division multiplexer of FIG. 1.

FIG. 2 is a time chart illustrating an operation of the conventional optical time-division multiplexer of FIG. 1. Further, (a) through (i) designate the waveforms of signals a to i flowing through the parts which are indicated in FIG. 1. Namely, the optical signal sent from the light source 61 has a constant light intensity as indicated by (a). Electrical signal b inputted to the branching optical modulator 62 is a clock signal, whose frequency is half the desired data rate and whose duty ratio is 50%. In the case of performing the modulation by using the clock signal, there is no waveform degradation due to what is called a pattern effect. Moreover, an obtained signal hardly contains any jitter. Furthermore, the incident light a is modulated by the branching optical modulator 62. The optical signals c and d, which are synchronized with the clock signal b and are different in phase from each other by 180 degrees, are outputted from the two output terminals of the branching optical modulator 62 and are further inputted to the first and second optical modulators 63 and 64, respectively.

Base-band signals e and f to be applied to the first and second optical modulator 63 and 64 are data signals and contain jitter and intersymbol interference. In this figure, the eye pattern of the base-band signals e and f are indicated by (e) and (f), respectively. One c of the optical signals outputted from the branching optical modulator 62 is modulated by the first optical modulator 63. Further, among pulses of a resultant signal, only a pulse g, which coincides with the data signal e, is outputted therefrom. Furthermore, the other signal d outputted from the branching optical modulator 62 is modulated by the second optical modulator 64. Then, only a pulse h, which coincides with the data signal f, is outputted therefrom. The patterns (g) and (h) are the eye patterns the eye patterns of the signals g and h, respectively. The waveforms of these pulses are originally formed from the clock signal. Thus, the jitters contained in the pulses are determined according to the jitter contained in the clock signal. Thus, the waveforms of the output signals of the optical modulators 63 and 64 hardly contain any jitter.

Figure 3:
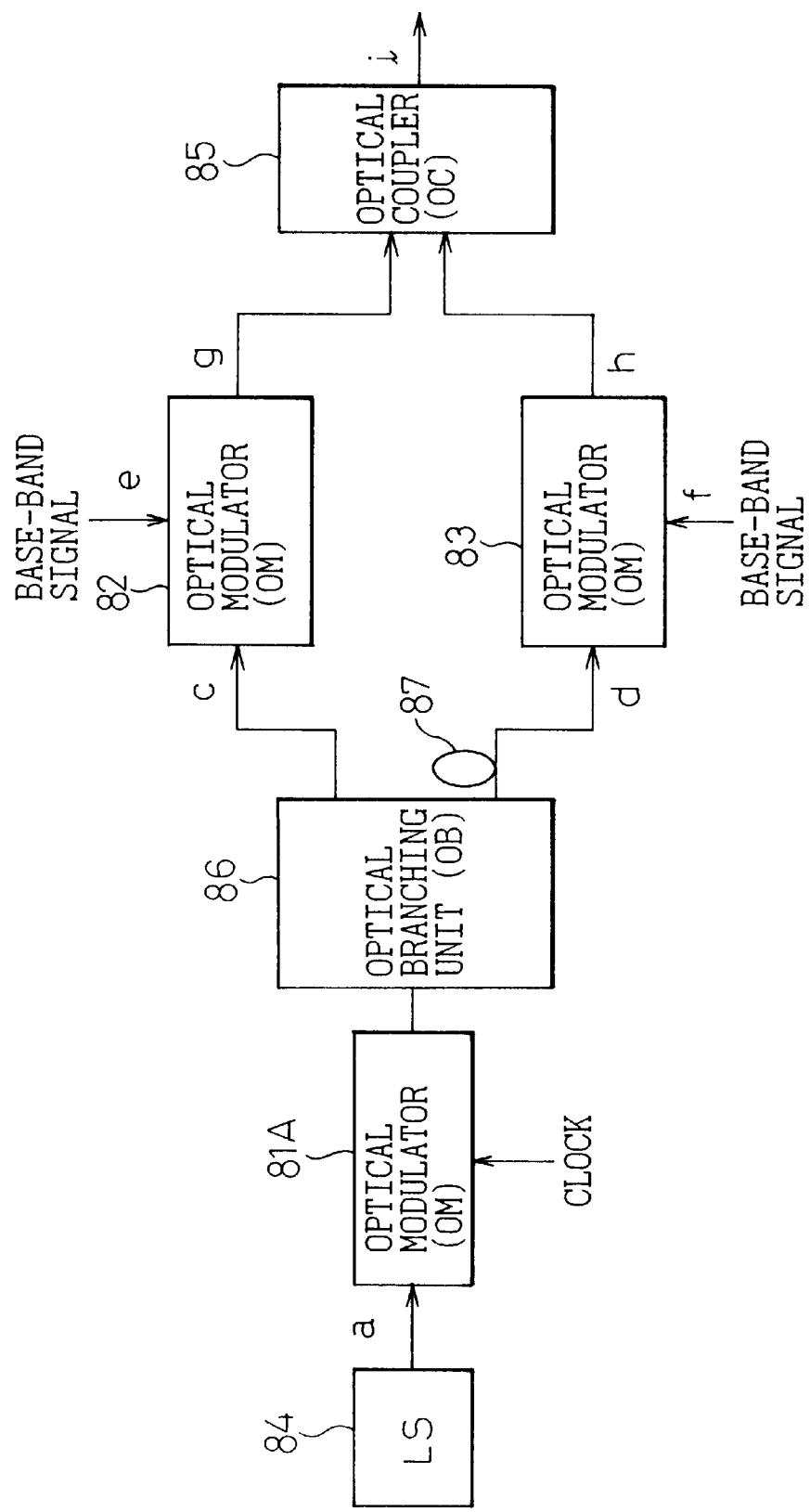
FIG. 3 is a diagram illustrating the circuit configuration of another conventional optical time-division multiplexer.

Then, an optical signal is synthesized in the optical coupler 65 from an output signal g, which is sent by the first optical modulator 63, and another output signal h, which is sent by the second optical modulator 64, and is thereafter outputted therefrom. Further, (i) designates the eye pattern of an output signal i from the optical coupler 65. Additionally, Mach-Zehnder optical modulators do not cause excessive variation in wavelength, so that the waveform of this output signal contains only spectra due to a modulation side-band. Moreover, the intersymbol interference in the direction of amplitude, which is contained in the waveform of the data drive signal is considerably cut off by the non-linear response characteristics of the first and second Mach-Zehnder optical modulators 63 and 64. Incidentally, in the case of the conventional multiplexer of FIG. 1, Mach-Zehnder optical modulators are used. However, optical modulators of another type may be used. FIG. 3 is a block diagram illustrating the circuit configuration of another conventional optical time-division multiplexer, whose configuration is obtained by using a one-output Mach-Zehnder modulator 81A, which is similar to the first and second optical modulators 63 and 64, as the branching optical modulator 62 and by branching an output light beam of this optical modulator by means of an optical branching device 86 into two branch paths and further by connecting a delay line 87, which causes a delay of half the period f of the signal, to one of the branch paths.

Figure 4:
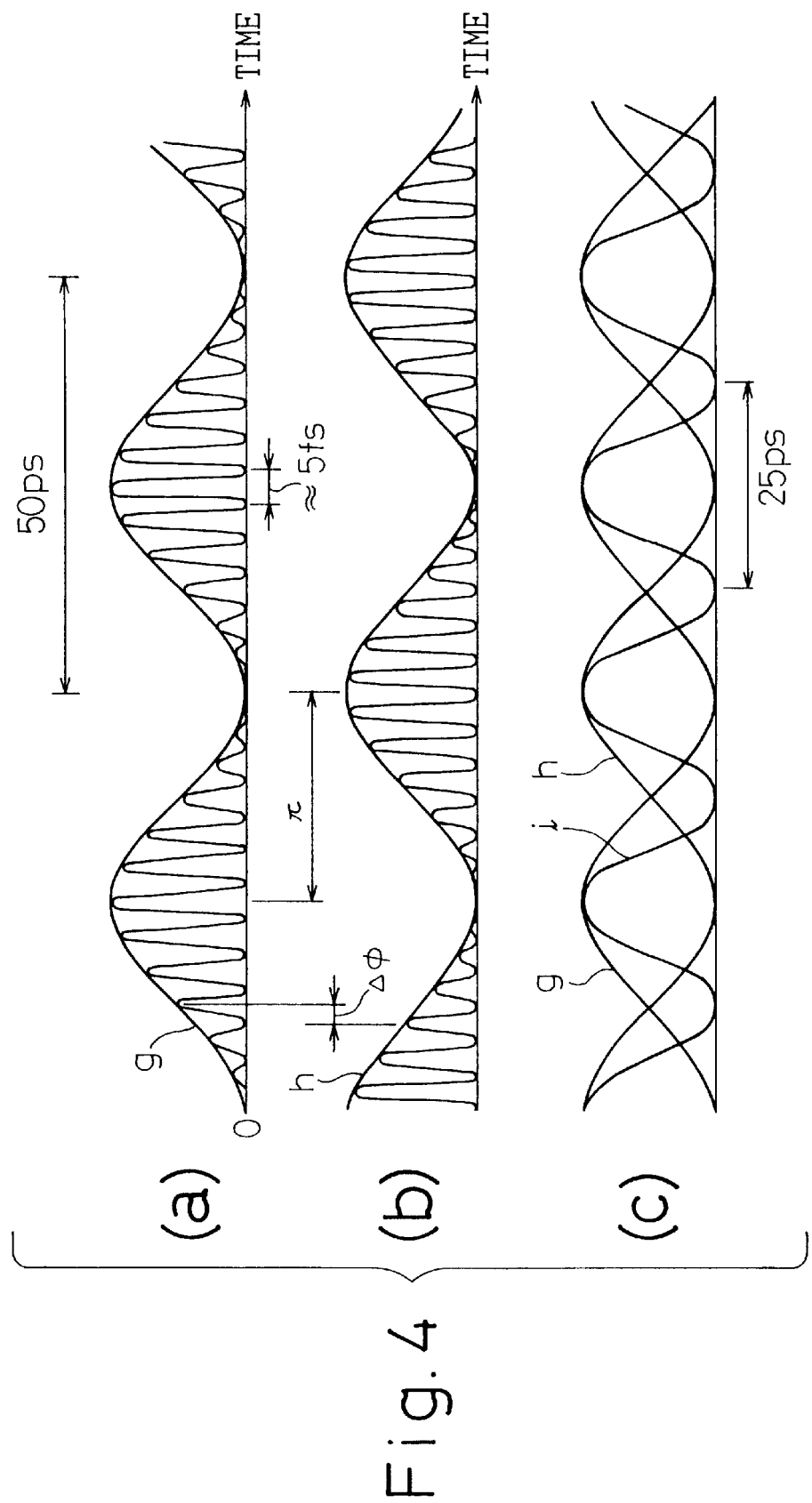
FIG. 4 is a principle diagram illustrating the influence of an optical phase in the optical time-division multiplexer.

FIG. 4 is a principle diagram illustrating the synthesis of an optical signal, which is performed in the optical coupler 65. As shown in this figure, a resultant optical signal occurs in the wavelength band of 1.5 μm. It is assumed that when the optical modulation signals g and h are incident on the optical coupler 65, the rate of information transfer is 20 Gb/s (Gbps). Therefore, actually, 10,000 cycles of a lightwave are contained in a bit period of 50 ps. Here, for understanding, the wavelength of the lightwave is illustrated as being long. The optical signal oscillates at a period of 5 fs and is modulated at the rate of 20 Gb/s. Thus, the envelope of the optical signal changes at a period of 50 ps. The envelopes of the two optical signals g and h are shifted by 25 ps from each other. Namely, the phases of the signals are different from each other by 180 degrees. Moreover, simultaneously, the optical phases of the lightwaves are different from each other by 180 degrees.

Figure 5:
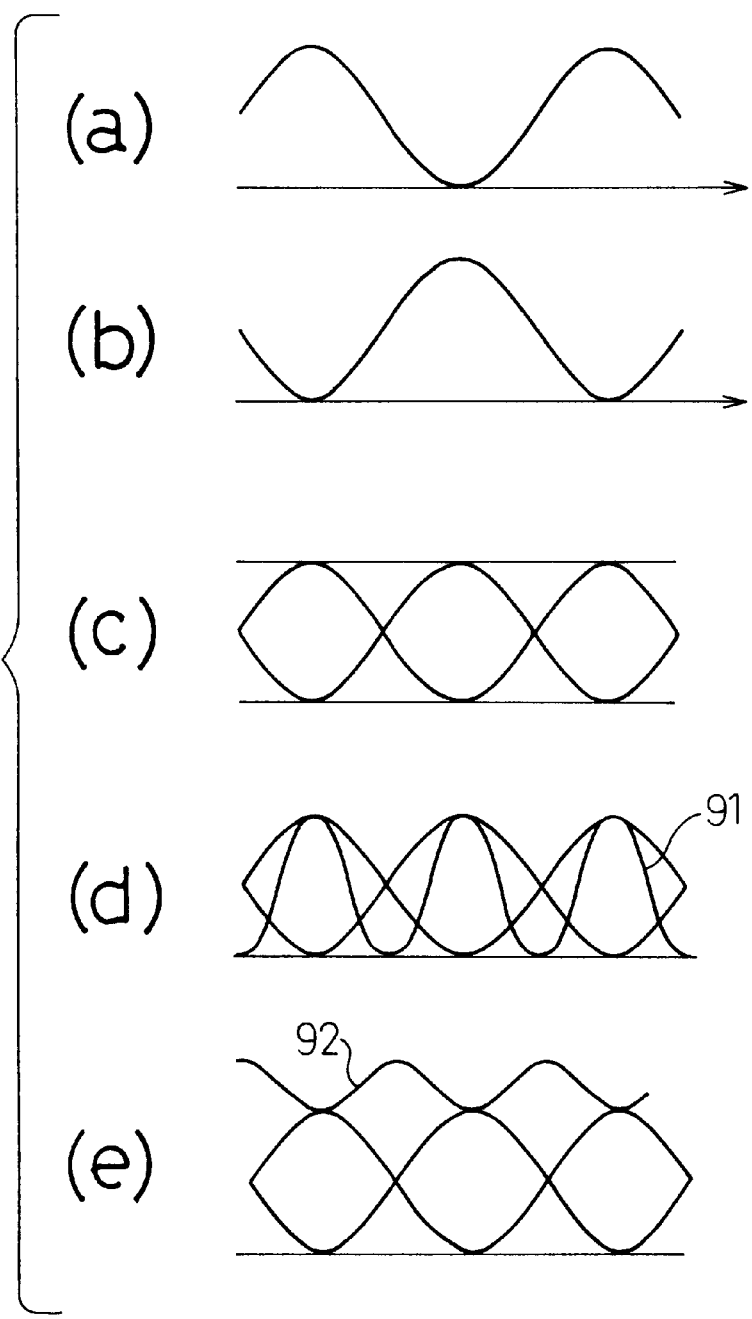
FIG. 5 is a diagram illustrating a change of an output of the optical time-division multiplexer in the case that the optical phase varies.

FIG. 5 is a diagram illustrating how two optical signals outputted from the optical coupler 65 change according to the optical phases of the two optical signals of the conventional optical time-division multiplexer of FIG. 1. When two optical signals, the phase difference between which is 180 degrees as indicated by (a) and (b) of FIG. 5, an optical time-division multiplexing signal of (c) of FIG. 5 is obtained. At that time, in the case that the difference between the optical phases of the optical modulation signals (a) and (b) is 180 degrees, the overlapping portions of the modulation signals cancel each other out. Thus, the synthesized time-division signal has a waveform as indicated by 91 and (d) in FIG. 5. In contrast, when the optical-phases of the optical signals indicated by (a) and (b) of FIG. 5 have the same polarity, the overlapping portions thereof are added to each other. Therefore, the synthesized time-division signal has a waveform as indicated by 92 and (e) in FIG. 5.

Figure 6A:
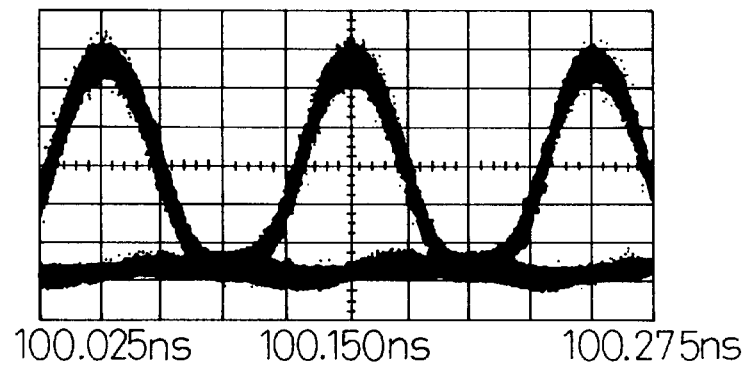
FIGS. 6A to 6C are waveform diagrams respectively illustrating examples of the change of an output of the optical time-division multiplexer in the case that the optical phase varies.
Figure 6B:
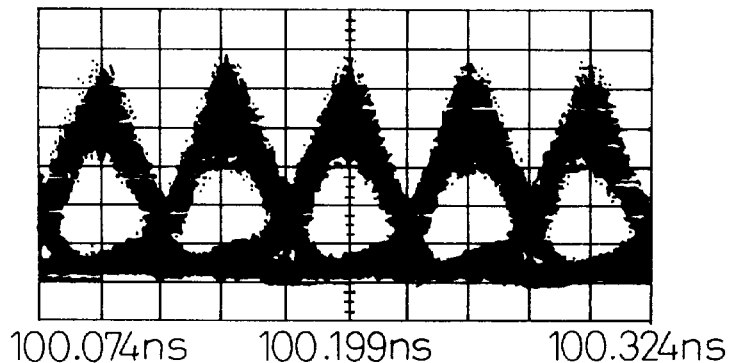
Figure 6C:
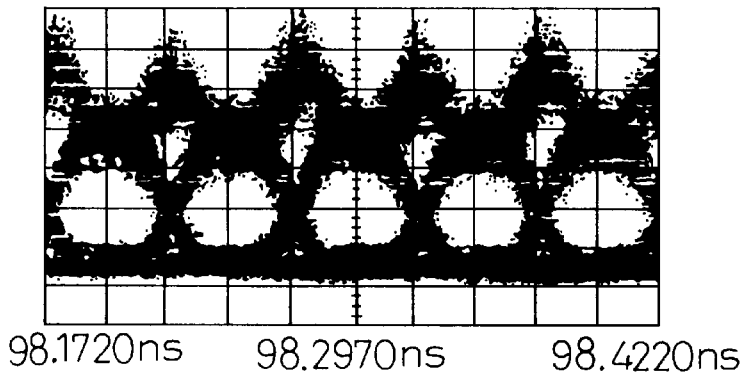

FIGS. 6A to 6C are diagrams illustrating the measured waveforms of the optical modulation signals. FIG. 6A illustrates the measured waveform of an RZ signal having the rate of information transfer of 10 Gb/s. FIG. 6B illustrates the measured waveforms in the case that the RZ optical signal of FIG. 6A, which has the rate of information transfer of 10 Gb/s, is changed into an optical time-division signal having the rate of information transfer of 20 Gb/s so that the optical phases of the optical modulation signals are different from each other by 180 degrees. At that time, when the optical phases of the overlapping portions of the optical modulation signals are different from each other by 180 degrees, the overlapping portions of the optical modulation signals cancel each other out. In FIG. 5, such a condition is illustrated in a diagram indicated by (d). Further, in contrast with the case of FIG. 6B, FIG. 6C illustrates the measured waveforms of the optical signals when the phases of the optical modulation signals are of the same polarity. Moreover, the overlapping portions of the optical signals are added to each other. Incidentally, in FIG. 5, such a condition is illustrated in a diagram indicated by (e).

As described by referring to FIG. 5, in the case that the time-division multiplexing is performed in the optical domain, when the optical phases of the optical signals of the respective systems are different from each other by 180 degrees, the overlapping skirt of the pulses weaken each other (or cancel each other out) as indicated by (d) in FIG. 5 and in FIG. 6B. Thus, a pulse-like waveform is obtained. Further, the eye pattern becomes relatively broadly extended as illustrated in FIG. 6B. Conversely, in the case that the optical phases of the optical signals of the systems have the same polarity, as indicated by (e) in FIG. 5 and illustrated in FIG. 6C, the overlapping skirt of slope portions of the optical signals intensifies each other (or are added to each other). Thereby, the signal waveform, by which mutual interference is largely caused, is obtained. At that time, as indicated in FIG. 6C, the eye pattern becomes smaller relative to an average level. Moreover, when the difference between the optical phases of the optical modulation signals is between 180 and 0 degree, the waveform, by which the intermediate interference condition is caused in an intermediate degree between the interference conditions of the cases respectively indicated by (d) and (e) in FIG. 5 or between the interference conditions of the cases of FIGS. 6B and 6C. Under the present conditions, an optical signal which is obtained when the optical phases of two optical signal to be incident on the optical coupler is different from each other by 180 degrees, is most desirable. In the case that such an optical time-division multiplexer is formed on a circuit board, the optical time-division multiplexer is designed so that the optical phases of two optical signal to be incident on the optical coupler are different from each other by 180 degrees. However, in the case of actual optical time-division multiplexers, owing to variations in accuracy of the manufacture of the optical time-division multiplexer, the optical phase difference therebetween is not always 180 degrees. Thus, desirable optical signals are sometimes not obtained.

Moreover, even if the optical phases of the optical signals g and h to be incident on the optical coupler are initially set so that the difference therebetween is 180 degrees or 0, the characteristics of the first and second optical modulators may vary owing to the change in temperature and thus the optical phases of the optical signals g and h may change from the initially set conditions. Furthermore, the optical signals c and d to be inputted to the first and second optical modulators sometimes change owing to the change in the characteristics of the branching optical modulator from the initially set conditions of the optical phases. Thus, the optical phases of the optical modulation signals g and h may change from the initial set conditions.

Figure 7:
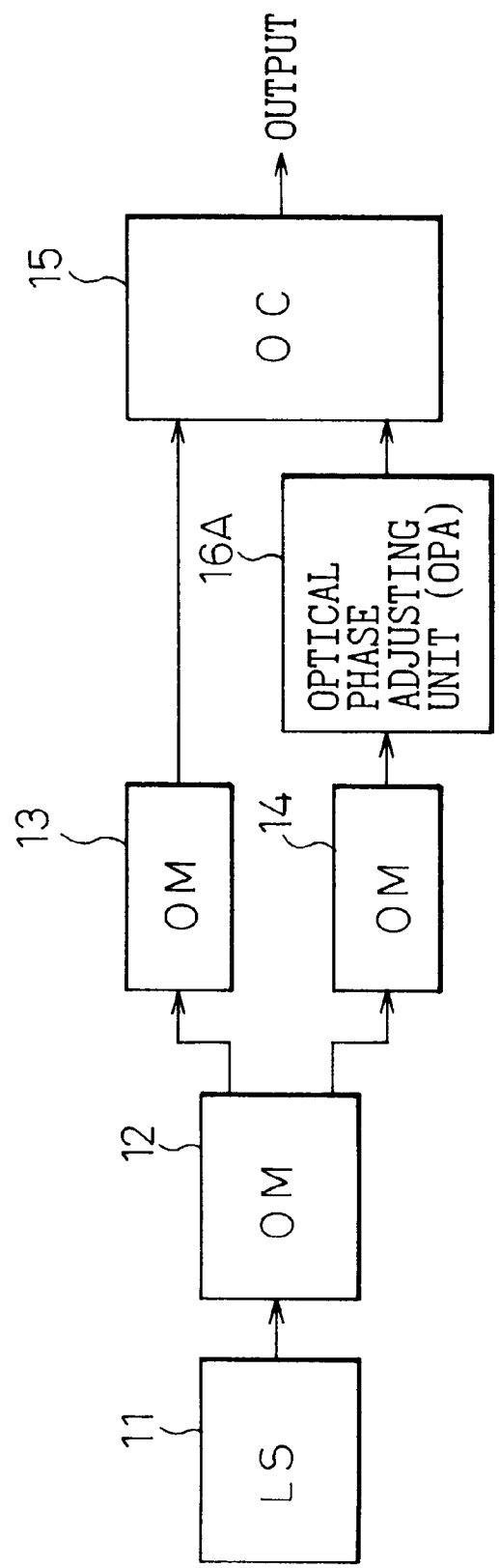
FIG. 7 is a block diagram illustrating the configuration of an optical time-division multiplexer which is a first embodiment of the present invention.

FIG. 7 is a block diagram illustrating the configuration of an optical time-division multiplexer which is a first embodiment of the present invention. In this figure, reference numeral 11 designates a light source; 12 a branching optical modulator; 13 and 14 first and second optical modulators; and 15 an optical coupler; 16 an optical phase adjusting unit (OPA). The light source 11, the branching optical modulator 12, the first and second optical modulators 13 and 14, and the optical coupler 15 are the same as the light source 61, the branching optical modulator 62, the first and second optical modulators 63 and 64, and the optical coupler 65 of FIG. 1, respectively. Thus, the optical time-division multiplexer of the first embodiment of the present invention is similar to the conventional optical time-division multiplexer of FIG. 1 except that the optical-phase adjusting unit 16A is provided in the first embodiment. Therefore, descriptions of the first embodiment, other than descriptions of the optical-phase adjusting unit 16A and an associated operation thereof, will be omitted. Incidentally, in the case of the first embodiment, the optical phase adjusting unit 16A is connected to a point between the second optical modulator 14 and the optical coupler 15. However, the optical phase adjusting unit 16A may be connected to a point between the first optical modulator 13 and the optical coupler 15. Further, the optical phase adjusting unit 16A may be connected to a point between the second optical modulator 14 and the optical coupler 15 and between the first optical modulator 13 and the optical coupler 15.

Figure 8:
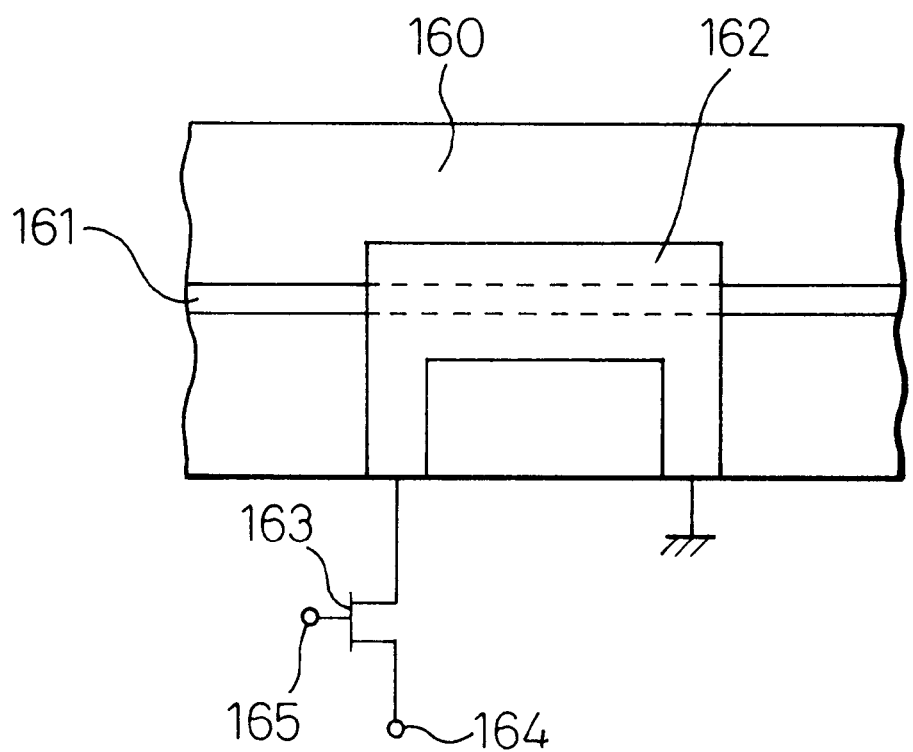
FIG. 8 is a diagram illustrating an example of optical-phase adjustment.

The optical phase adjusting unit 16A is realized by various methods. FIG. 8 is a diagram illustrating the configuration of the optical phase adjusting unit 16A of the first embodiment. In this figure, reference numeral 160 designates a circuit board (or substrate) made of lithium niobate (LiNbO$_3$); 161 a waveguide formed by diffusing Ti thereinto; 162 an electrode formed on the waveguide 161; 163 an FET transistor; 164 a power supply terminal; and 165 a control terminal. As described concerning the Mach-Zehnder optical modulator illustrated in FIG. 1, the optical phase of an optical modulation signal propagating through the dielectric waveguide is controlled by utilizing the electric field which is produced by forming the electrode on the dielectric waveguide and applying the control signal to the electrode. The optical phase of an optical signal can be changed by using the same configuration. In this case, an optical signal outputted from the optical coupler 15 is first measured in the manufacturing process and subsequently, an electric current to be inputted to the control terminal 165 of the FET transistor 163 is set in such a way as to obtain an output optical signal having a desired waveform. Because it is unnecessary to change the optical-phase difference once set, the applied current is maintained at a constant value. Further, because it is unnecessary to change the optical-phase difference, the optical time-division multiplexer may be provided with an electromechanical transducer device (to be described later) and further, a suitable delay may be generated by adjusting the electromechanical transducer device.

Figure 9:
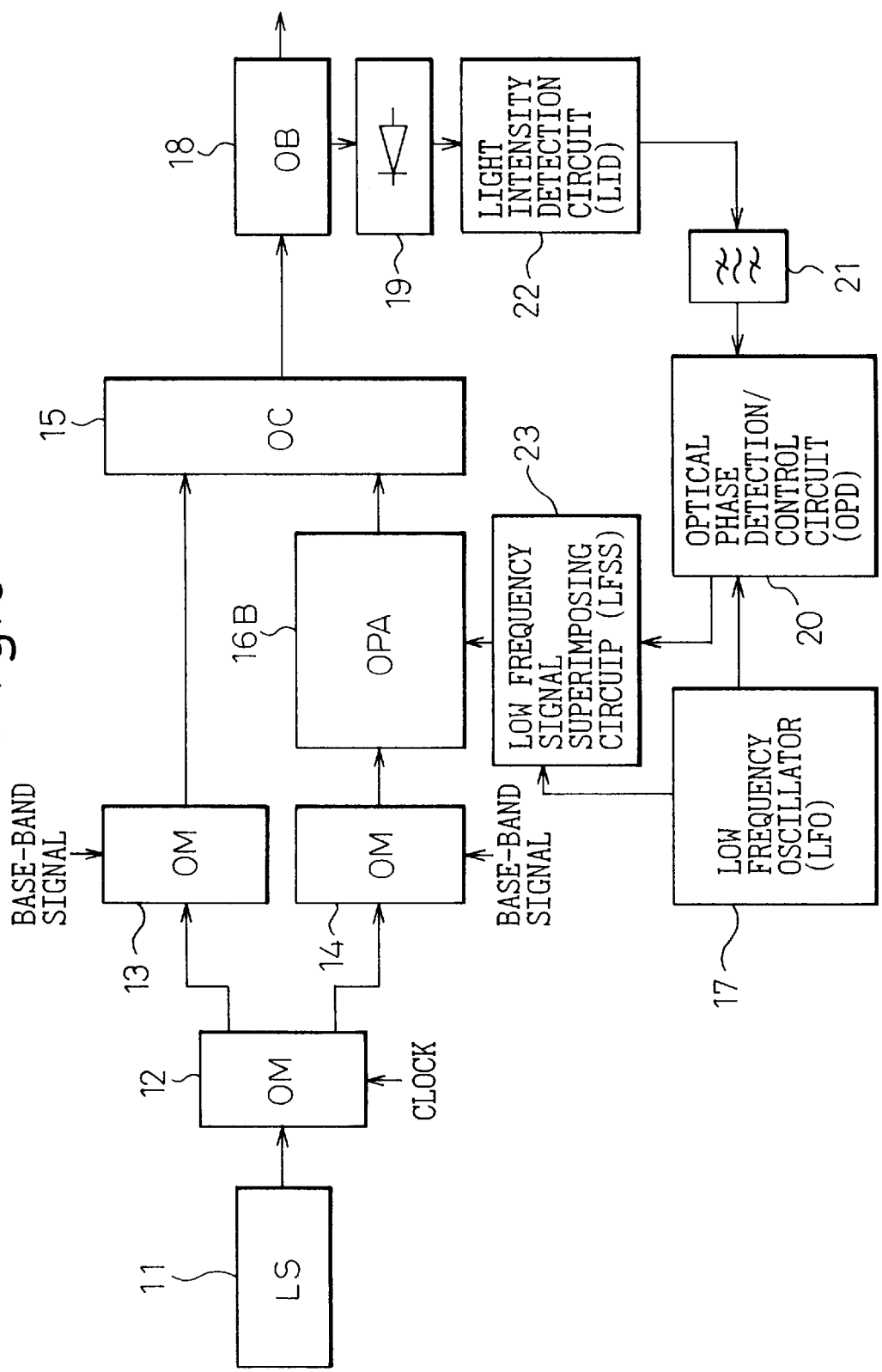
FIG. 9 is a block diagram illustrating the configuration of another optical time-division multiplexer which is a second embodiment of the present invention.

FIG. 9 is a block diagram illustrating the configuration of another optical time-division multiplexer which is the second embodiment of the present invention. In the case of the second embodiment, a feedback control operation is performed in such a manner that the optical-phase difference between two optical signals to be used for the synthesis is always 180 degrees. In the configuration of FIG. 9, the light source 11, the branching modulator 12, the first and second modulators 13 and 14, and the optical coupler 15 are the same as those of the first embodiment of FIG. 7, namely, the light source 61, the branching modulator 62, the first and second optical modulators 63 and 64, and the optical coupler 65 of FIG. 1, respectively. Hence, the description of these elements is omitted herein.

In FIG. 9, reference numeral 16B designates an optical-phase adjusting unit; 17 a low-frequency oscillator (LFO); 18 an optical branching device (OB); 19 a photodetector; 20 an optical-phase-detection/control circuit (OPD); 21 a bandpass filter; 22 a light intensity detecting circuit; and 23 a low-frequency signal superimposing circuit (LFSS). The optical-phase adjusting unit 16B is operative to change the optical phase of an optical modulation signal from the optical modulator 14 according to a low-frequency signal applied from the low-frequency signal superimposing circuit 23. The low-frequency oscillator 17 generates a signal having a frequency which is sufficiently lower than that of the clock signal. The optical branching device 18 is operative to branch a part of the optical signal outputted from the optical coupler 15. However, an ordinary optical branching device is used as the device 18. Therefore, the further description of the device 18 is omitted herein. The photodetector 19 is a device for converting an optical signal branched by the optical branching device 18 into an electrical signal. Further, a pin photodiode or the like is used as the photodetector 19. The light intensity detecting circuit 22 is a circuit for detecting an amount of light received by the photodetector 19. This photodetector 19 and the light intensity detecting circuit 22 detect low-frequency signals generated by the low-frequency oscillator 17. Thus, the photodetector 19 and the light intensity detecting circuit 22 need not have high response speeds. The bandpass filter 21 is operative to permit only signal components which have frequencies close to the low frequency generated by the low-frequency oscillator 17, to pass therethrough. The optical-phase-detection/control circuit 20 stores phase control value data. Further, the circuit 20 determines what phase the low-frequency signal outputted by the low-frequency oscillator 17 has when the signal strength of the signal outputted from the bandpass filter 21 is maximum. Then, the circuit 20 increases or decreases the phase control value according to a result of the determination. Thereafter, the circuit 20 outputs the resultant phase control value to the low-frequency signal superimposing circuit 23. This low-frequency signal superimposing circuit 23 superimposes a low-frequency signal on a signal representing the optical-phase control value outputted from the optical-phase-detection/control circuit 20 and then outputs a resultant signal to the optical-phase adjusting unit 16B. Consequently, the optical phase of the optical signal inputted to the optical coupler 15 from the second optical modulator 14 changes at the frequency of the low-frequency signal about a level indicated by the optical-phase control value. Incidentally, it is assumed that the amount of the change of the optical phase due to the low-frequency signal is sufficiently small.

Figure 10A:
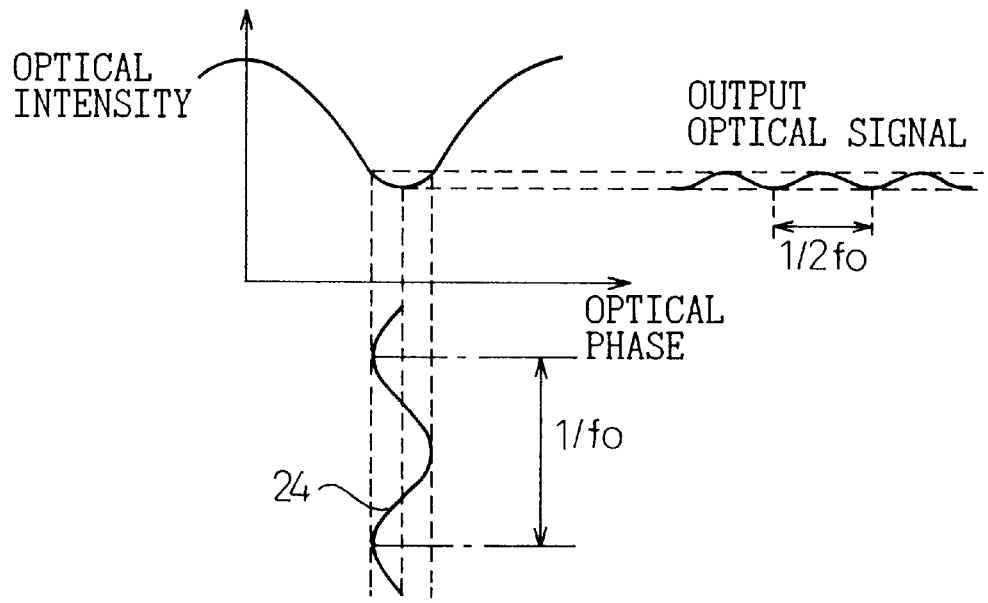
FIGS. 10A and 10B are diagrams illustrating the principle of the optical-phase control (operation) of the optical time-division multiplexer which is the second embodiment of the present invention.
Figure 10B:
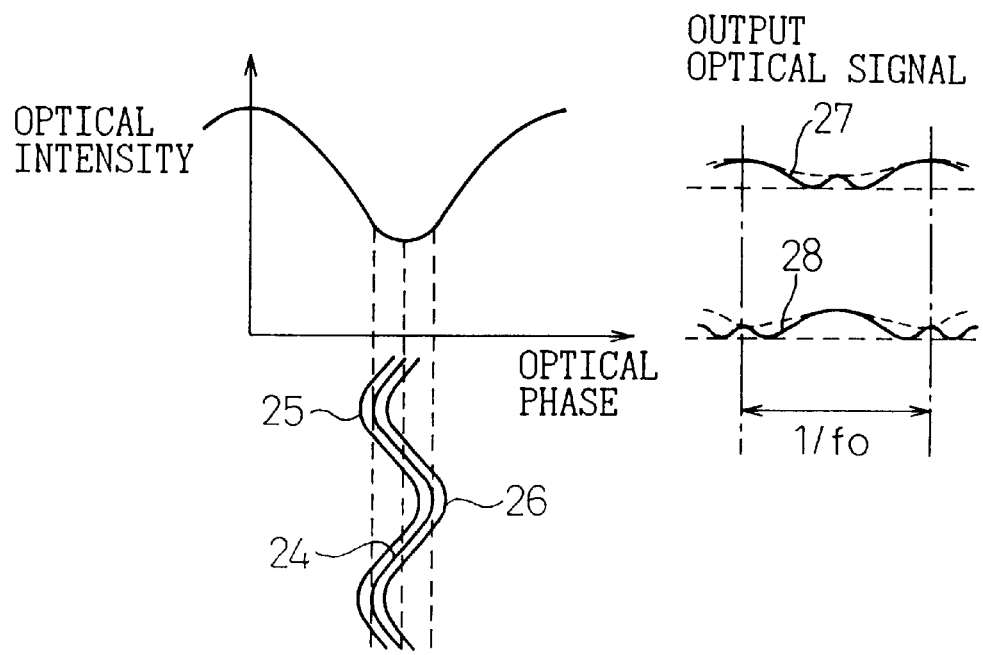

FIGS. 10A and 10B are diagrams illustrating the principle for detecting the optical-phase difference between the first and second optical modulation signal inputted to the optical coupler 15. As described with reference to FIGS. 4 and 5, when the optical phase difference between the two optical modulation signal is 180 degrees, the overlapping skirt (or slope) portions of the two optical pulses cancel each other out (or weaken each other). Thus, the light intensity of the optical signal having undergone time-division multiplexing becomes minimum. In contrast, when the optical phase difference between the two optical modulation signal is 0, the overlapping skirt (or slope) portions of the two optical pulses are added to each other (or intensify each other). Thus, the light intensity of the optical signal having undergone time-division multiplexing becomes a maximum. Here, it is assumed that, as illustrated in FIG. 10A, the optical-phase control value indicates a state in which the optical-phase difference is 180 degrees, and that a low-frequency signal having a frequency $f_0$ is outputted from the low-frequency oscillator 17 and subsequently, another signal is superimposed on this low-frequency signal in the low-frequency signal superimposing portion (or circuit) 23 and thereafter, a resultant signal is applied to the optical-phase adjusting unit 16B. Therefore, as indicated by reference numeral 24, the optical-phase difference changes periodically about 180 degrees with a small amplitude. The light intensity of the optical signal, which has undergone the time-division multiplexing when the optical-phase difference is 180 degrees, is minimum. Therefore, as shown in a right-side portion of FIG. 10A, the light intensity of the optical signal changes at a frequency $2f_0$ which is twice the frequency of the low-frequency signal. Thus, this optical signal has no component of the frequency $f_0$. If the optical-phase control value is shifted and the central level of the optical-phase difference changes from this condition as indicated by reference numeral 25 in FIG. 10B, the light intensity of the time-division multiplexed optical signal changes as a signal, which is indicated by reference numeral 27 in the right-side portion of this figure, changes. Further, if the center level of the optical-phase difference changes in the opposite direction as indicated by reference numeral 26, the light intensity of the time-division multiplexed optical signal changes as a signal, which is indicated by reference numeral 28 in the right-side portion of this figure, changes. In this manner, when the center level of the optical-phase difference is shifted from 180degrees, the light intensity of the optical signal contains a component having the frequency $f_0$. In addition, the component of the frequency $f_0$ changes along an envelope represented by dashed curves. Thus, at a position where the intensity of this component is maximum, the optical phase of this component is different from that of the low-frequency signal by 180 degrees. Therefore, the center level of the optical-phase difference is maintained at 180 degrees by extracting the component of the frequency $f_0$ from the output signal of the light-intensity detecting circuit 22 by means of the bandpass filter 22 and further controlling the optical-phase control value so that the signal strength of the signal outputted from the bandpass filter 21 is 0. As described hereinabove, the optical phase of the signal outputted from the bandpass filter 21 at the time, when the signal strength of this signal is maximum, is different from that of the low-frequency by 180 degrees, depending upon the direction in which the center level of the optical-phase difference is shifted from 180 degrees. Then, the optical-phase-detection/control circuit 20 determines from this optical phase whether the optical-phase control value is increased or decreased. For example, in the case that the signal outputted from the bandpass filter 21 changes as the signal, which is indicated by reference numeral 27 in the right-side part of FIG. 10B, changes, the circuit 20 performs a control operation so that the optical-phase control value is increased. In contrast, in the case that the signal outputted from the bandpass filter 21 changes as the signal, which is indicated by reference numeral 27 in the right-side part of FIG. 10B, changes, the circuit 20 performs a control operation so that the optical-phase control value is increased.

Figure 11A:
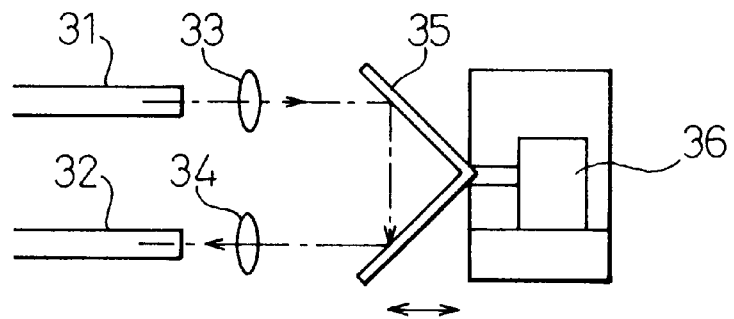
FIGS. 11A, 11B and 11C are diagrams illustrating examples of the configurations of an optical-phase adjusting unit.
Figure 11B:
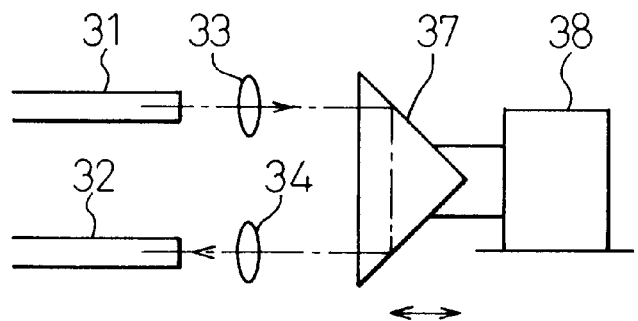
Figure 11C:
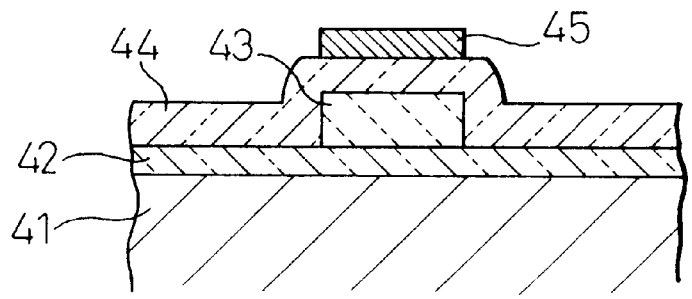

An optical-phase control unit of the type in which an electrode is formed on a dielectric waveguide and further, the optical-phase of an optical modulation signal propagating through the dielectric waveguide is controlled by the strength of the electric field formed by applying a control signal to the electrode, is used as the unit 16B. Further, a signal sent from the low-frequency signal superimposing circuit 23 is applied to the control electrode 165 of the FET transistor 163. In the case of the second embodiment, the frequency at which the optical phase is changed, is low, so that even an optical-phase adjusting unit 16B, whose working speed is low, can be used as the unit 16B. FIGS. 11A to 11C are diagrams illustrating the configurations of examples of the optical-phase adjusting unit 16B. In the case of the example of FIG. 11A, lenses 33 and 34 and a reflecting mirror 35 are placed between an optical fiber 31, which is connected to the second optical modulator 14, and another optical fiber 32 connected to the optical coupler 15. Further, this reflecting mirror 35 is moved by an electromechanical transducer device 36 in the direction of an arrow. Thereby, the optical path length is controlled. When a signal sent from the low-frequency signal superimposing circuit 36 is applied to the electromechanical transducer device 36, the mirror 35 oscillates as indicated by arrows. In this case, the voltage level corresponding to the optical-phase control value outputted by the optical-phase-detection/control circuit 20 serves as a bias voltage. Thus, the mirror 35 vibrates about the position, which is indicated by the optical-phase control value, at the frequency $f_0$ of the low-frequency signal. Consequently, the optical phase of the optical modulation signal sent from the second optical modulator 14 is controlled. In the case of the example of FIG. 11B, a prism or a corner cube (reflector) 37 is provided in the unit 16B, instead of the reflecting mirror of FIG. 11A, and is oscillated by the electromechanical transducer device 38 in the direction of the arrows. In the case of a modification of this example, the optical fibers 31 and 32 are arranged in a line. Then, the optical path length is controlled by moving one of these optical fibers relative to the other optical fiber. Incidentally, an electrostrictive device such as a piezoelectric devices, magnetostrictive devices, voice coil motors or the like may be used as the electromechanical transducer devices 36 and 38. FIG. 11C is a sectional view of a primary part of another example of the optical-phase adjusting unit 16B, which is adapted to control the optical phase by utilizing heat. In this figure, reference numeral 41 denotes a substrate (or board); 42 and 44 insulating layers; 43 a waveguide; and 45 a heating electrode. The substrate 41 is made of materials, such as a metal and a semiconductor, which have good thermal conductivity. Further, the insulating layers 42 and 44 are made of, for instance, $SiO_2$ and are formed by performing evaporation or sputtering. The optical waveguide 43 is made of a material whose refractive index varies with temperature and is formed by doping Ti into SiO$_2$. The heating electrode 45 is formed on this optical waveguide 43 through the insulating layer 44. This heating electrode 45 is made of a material, such as Ti, Ta, or Ni—Cr, whose electrical resistance is high. The optical waveguide 43 is optically connected to a point between the second optical modulator 14 and the optical coupler 15. A signal outputted from the low-frequency signal superimposing circuit 23 is applied to the heating electrode 45. Thereby, the temperature of the heating electrode 45 changes from the corresponding central temperature in accordance with the low-frequency signal. Further, heat is transmitted from the heating electrode 45 to the optical waveguide 43 through the insulating layer 44. Thus, the temperature of the optical waveguide 43 is changed. The refractive index of the optical waveguide 43 changes in response to the transmission (or transfer) of the heat thereto. This results in change in the optical phase of the optical modulation signal. In the case of the second embodiment, in the low-frequency signal superimposing circuit 23, a signal representing the optical-phase control value outputted from the optical-phase-detection/control circuit 20 is superimposed on the low-frequency signal. A resultant signal is applied to the optical-phase adjusting unit 16B to thereby control the optical phase. However, the change of the optical phase according to the optical-phase control value may be performed separately from the change thereof in accordance with the low-frequency signal, by dividing the optical-phase adjusting unit 16B into two parts. Such a control operation is performed by the third embodiment which will be described hereinbelow.

Figure 13:
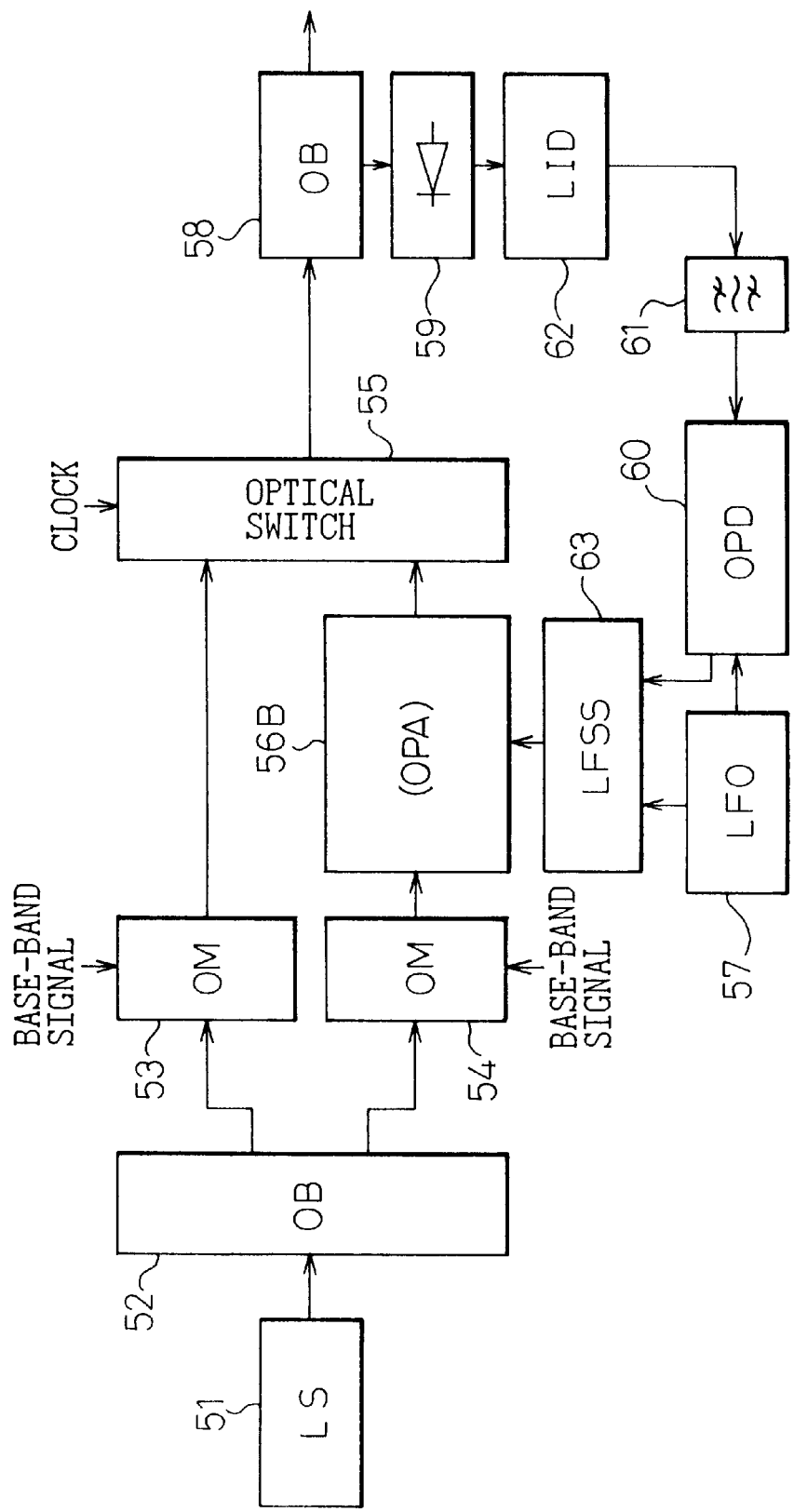
FIG. 13 is a block diagram illustrating the configuration of yet another optical time-division multiplexer which is a fourth embodiment of the present invention.

FIG. 12 is a block diagram illustrating the configuration of still another optical time-division multiplexer which is the third embodiment of the present invention. The third embodiment is different from the second embodiment in that the optical-phase adjusting unit 16C into first and second optical-phase adjusting sub-units 16d and 16e, and that the low-frequency signal outputted from the low-frequency oscillator is applied to the first optical-phase adjusting unit 16d, while a signal representing the optical-phase control value outputted from the optical-phase-detection/control circuit 20 is applied to the second optical-phase modulator 16e. Therefore, the third embodiment does not require the low-frequency signal superimposing circuit 23. The remaining composing elements of the third embodiment are the same as the corresponding element of the second embodiment. FIG. 13 is a block diagram illustrating the configuration of yet another optical time-division multiplexer which is a fourth embodiment of the present invention. In FIG. 13, reference numeral 51 designates a light source; 52 an optical branching device; 53 and 54 first and second optical modulators; 55 an optical switch; 56B an optical-phase adjusting unit; 57 low-frequency oscillator; 58 an optical branching device; 59 a photodetector; 60 an optical-phase-detection/control circuit; 61 a bandpass filter; 62 a light-intensity detecting circuit; and 63 a low-frequency signal superimposing circuit. In the case of the fourth embodiment, an optical signal, which has an optical constant level is outputted from the light source 51 such as a semiconductor laser, is branched by the optical branching device 52 into branch signals. Then, the branch signals are inputted to the first and second optical modulators 53 and 54, respectively. These branch signals are intensity-modulated by a base-band signal. Then, the optical switch 55 performs switching between the optical modulation (or modulated) signal, which is outputted from the first optical modulators 53, and the second modulation signal outputted from the second optical modulator 54, and outputs the signal from the selected modulator, in accordance with the clock signal. Thus, a time-division multiplexer is obtained. The configuration of a portion in which the optical-phase of the optical modulation signal outputted by the second optical modulator 54 is adjusted (or regulated) by feeding back the optical signal outputted by the optical switch 55 of this embodiment is the same as of the corresponding portion of the second embodiment. Further, an ordinary optical branching device and ordinary optical modulators are used as the optical branching device 52 and the first and second optical modulators 53 and 54, respectively.

Figure 14:
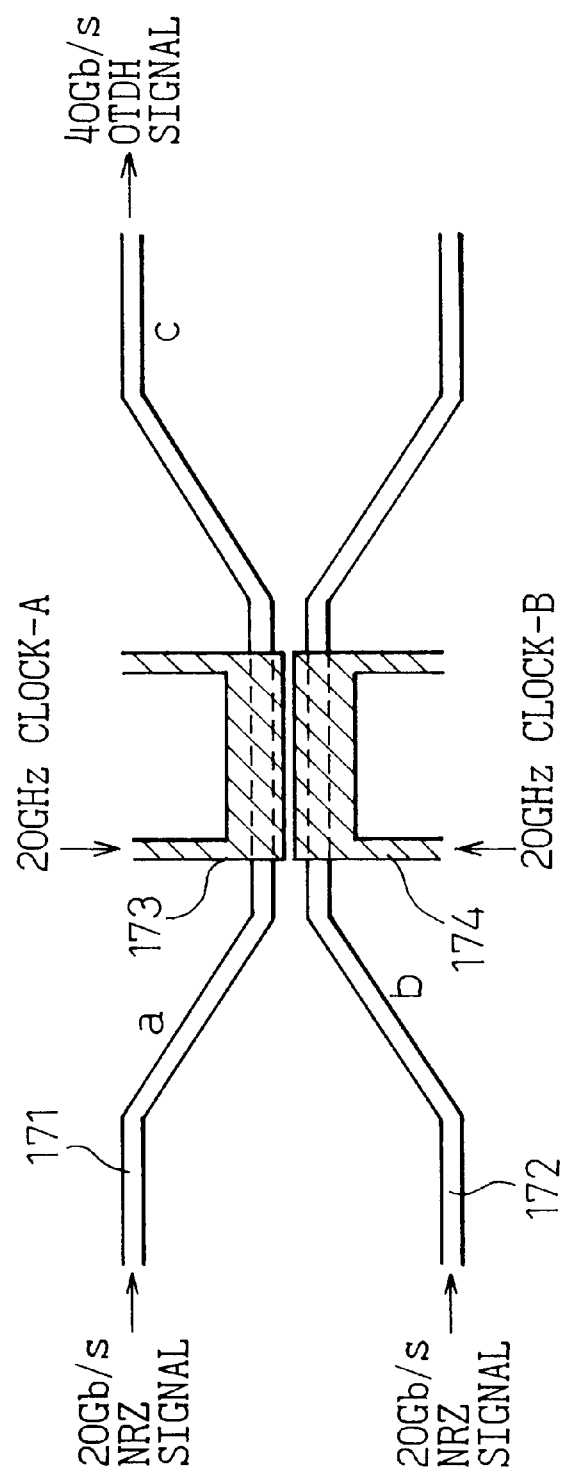
FIG. 14 is a diagram illustrating the configuration of an example of an optical switch of the optical time-division multiplexer which is the fourth embodiment of the present invention.
Figure 15:
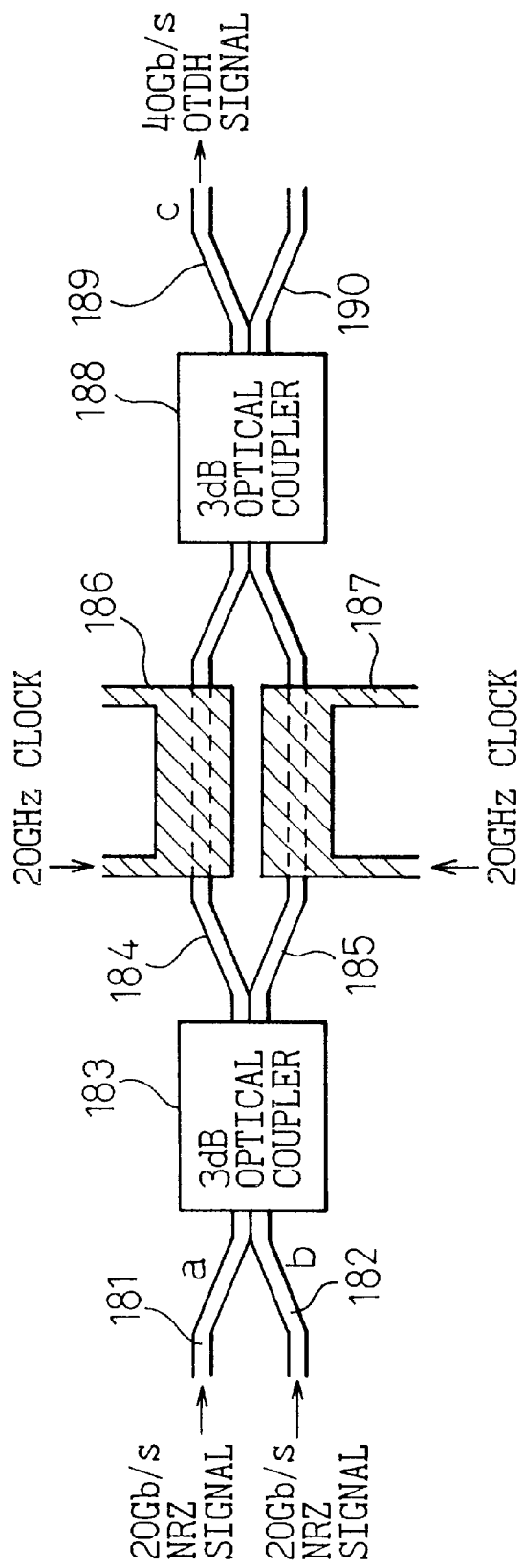
FIG. 15 is a diagram illustrating the configuration of another example of the optical switch of the optical time-division multiplexer which is the fourth embodiment of the present invention.

FIGS. 14 and 15 are diagrams illustrating the configurations of examples of the optical switch, respectively. In the case of the example of the optical switch of FIG. 14, the optical modulation signal outputted from the first optical modulator 53 is inputted to the optical waveguide 171, while the optical modulation signal outputted from the second optical modulator 54 through the optical-phase adjusting unit 56B is inputted to the optical waveguide 172. The waveguides 171 and 172 are placed close to and in parallel with each other. Further, electrodes 173 and 174 are provided on a portion of the waveguide 171 and a portion of the waveguide 172, which portions extend in parallel with each other, respectively. As illustrated in FIGS. 1 and 8, in the case of the waveguides 69 and 161 formed by diffusing Ti into the circuit board (or substrate) made of lithium niobate (LiNbO$_3$), when the control signal is applied to the waveguide, the refractive index of the dielectric waveguide is changed by the electric field strength. In the case of this embodiment, two signals CLOCK-A and CLOCK-B, which have a frequency of 20 GHz and are different in phase from each other by 180 degrees, are applied to the electrodes. When applying such signals, the mode coupling efficiency between the two waveguides changes, so that the optical waveguide for outputting optical signals is changed (or switched) at a frequency of 20 GHz. Further, in the case of the example of the optical switch of FIG. 15, the optical modulation signal outputted from the first optical modulator 53 is inputted to the optical waveguide 181, while the optical modulation signal outputted from the second optical modulator 54 through the optical-phase adjusting unit 56B is inputted to the optical waveguide 182. After being inputted to a 3-dB optical coupler from these waveguides, the optical signal is again branched into branch signals, which are inputted to two waveguides 184 and 185, respectively. Further, electrodes 186 and 187 are provided on the waveguides 184 and 185, respectively, at positions spaced from each other. Thereafter, the branch signals are again inputted to and coupled by a 3-dB optical coupler. Moreover, signals which have a frequency of 20 GHz and are different in phase from each other by 180 degrees, are applied to the two electrodes 186 and 187. The waveguides are switched in such a way that the phase difference between the two optical modulation signal to be coupled is 0 or 180 degrees. Thereby, signals outputted from the 3-dB optical coupler 188 to a waveguide 189 is changed (or switched) at a frequency of 20 GHz.

Figure 16:
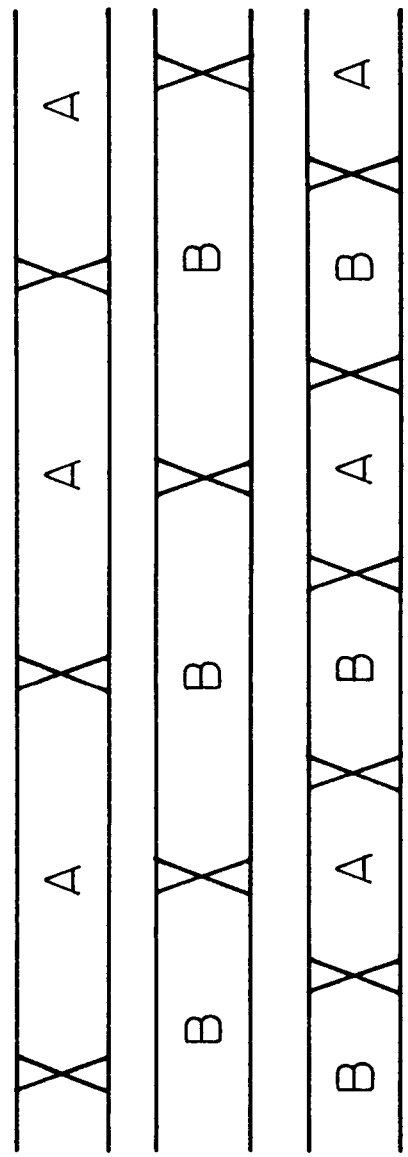
FIG. 16 is a time chart illustrating operations of the optical switches of FIGS. 14 and 15.

FIG. 16 is a time chart illustrating operations of the optical switches of FIGS. 14 and 15 and illustrates operations of the signals a, b and c of FIGS. 14 and 15.

Here, note that in the case of the fourth embodiment, two optical signals are generated by branching the optical signal, which is outputted from the light source 51, by means of the optical branching device 52. However, two light sources such as semiconductor lasers may be provided in the multiplexer. Further, optical outputs may be adapted to be inputted to the first and second optical modulators 53 and 54, respectively. In this case, although the optical phases of outputs of the light source are different from each other, the optical phase is controlled by a feedback loop including the optical-phase adjusting unit 56B. Consequently, the time-division multiplexing is stably achieved.

FIG. 17 is a block diagram illustrating the configuration of yet another optical time-division multiplexer which is the fifth embodiment of the present invention. The fifth embodiment is obtained by dividing the optical-phase adjusting unit 56C into two parts and by further enabling the change of the optical phase according to the low-frequency signal and the change of the optical phase according to the optical-phase control value to be performed separately from each other in the fourth embodiment, similar to the case of the third embodiment. Thus, a further description is omitted herein.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. An optical time-division multiplexer, comprising:

first and second optical modulators adapted to respectively output first and second optical modulation signals which are synchronized with a clock signal and correspond to different time slots, respectively;

an optical coupler for performing time-division multiplexing of the first and second optical modulation signals respectively outputted by the first and second optical modulators; and an optical-phase adjusting unit for receiving one of the first and second optical modulation signals and for regulating an optical phase of the inputted optical signal.

2. The optical time-division multiplexer according to claim 1, which further comprises:

a low-frequency oscillator for generating a low-frequency signal, whose frequency is sufficiently lower than that of the clock signal;

an optical-phase-detection/control circuit for detecting a frequency-component signal of the low-frequency signal from the optical signal outputted from the optical coupler, for making a comparison between optical-phases of the detected frequency-component signal and the low-frequency signal and for generating a control signal according to a result of the comparison; and a low-frequency signal superimposing circuit for generating a regulation control signal by superimposing the low-frequency signal on the control signal.

wherein the optical-phase adjusting unit is adapted to change adjustment amounts of the optical phase, which respectively correspond to the optical modulation signals, according to the regulation control signal.

3. The optical time-division multiplexer according to claim 2, wherein the optical-phase adjusting unit has an electrode which is formed on a dielectric waveguide, wherein the regulation control signal is applied from the low-frequency superimposing circuit to the electrode, and wherein the optical phase of the optical modulation signal propagating through the waveguide is controlled by an electric field strength.

4. The optical time-division multiplexer according to claim 2, wherein the optical-phase adjusting unit has a heating electrode which is formed on a waveguide made of a material whose refractive index varies with temperature, wherein the regulation control signal is applied from the low-frequency superimposing circuit to this heating electrode, and wherein the optical phase of the optical modulation signal propagating through the waveguide is controlled.

5. The optical time-division multiplexer according to claim 2, wherein the optical-phase adjusting unit has an electromechanical transducer device which is operative to change a space propagation path length, wherein the electromechanical transducer device is controlled in accordance with the regulation control signal sent from the low-frequency signal superimposing circuit, and wherein the optical phase of the optical modulation signal is controlled.

6. The optical time-division multiplexer according to claim 2, wherein the optical-phase-detection/control circuit generates the control signal so that the optical phase difference between the first and second optical modulation signals to be incident on the optical coupler is 180 degrees.

7. The optical time-division multiplexer according to claim 3, wherein the optical-phase-detection/control circuit generates the control signal so that the optical phase difference between the first and second optical modulation signals to be incident on the optical coupler is 180 degrees.

8. The optical time-division multiplexer according to claim 4, wherein the optical-phase-detection/control circuit generates the control signal so that the optical phase difference between the first and second optical modulation signals to be incident on the optical coupler is 180 degrees.

9. The optical time-division multiplexer according to claim 5, wherein the optical-phase-detection/control circuit generates the control signal so that the optical phase difference between the first and second optical modulation signals to be incident on the optical coupler is 180 degrees.

* * * * *

UNITED STATES PATENT AND TRADEMARK OFFICE
CERTIFICATE OF CORRECTION

PATENT NO.:    5,917,628
DATED     :    June 29, 1999
INVENTOR(S):   Hiroki OOI et al.

It is certified that error appears in the above-identified patent and that said Letters Patent is hereby corrected as shown below:

On the title page, [73] Assignee, change "Fujitsu Co. Ltd." to --FUJITSU LIMITED--.

Signed and Sealed this

Fourteenth Day of September, 1999

Attest:

Q. TODD DICKINSON

*Attesting Officer*          *Acting Commissioner of Patents and Trademarks*